US010904753B2

(12) United States Patent
Sun et al.

(10) Patent No.: US 10,904,753 B2
(45) Date of Patent: *Jan. 26, 2021

(54) SYSTEMS AND METHODS FOR AUTHENTICATION

(71) Applicant: Huawei Technologies Co., Ltd., Shenzhen (CN)

(72) Inventors: Sheng Sun, Kanata (CA); Kwok Shum Au, Ottawa (CA); Yunbo Li, Shenzhen (CN); Phillip Barber, McKinney, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,235

(22) Filed: Oct. 12, 2018

(65) Prior Publication Data

US 2019/0053052 A1   Feb. 14, 2019

Related U.S. Application Data

(63) Continuation of application No. 15/492,911, filed on Apr. 20, 2017, now Pat. No. 10,104,546, which is a
(Continued)

(51) Int. Cl.
*H04L 29/06*   (2006.01)
*H04W 12/06*   (2009.01)
(Continued)

(52) U.S. Cl.
CPC ............ *H04W 12/06* (2013.01); *G06F 21/44* (2013.01); *H04L 63/06* (2013.01); *H04L 63/08* (2013.01);
(Continued)

(58) Field of Classification Search
CPC ....... H04W 12/06; H04W 12/08; G06F 21/30; G06F 21/44
See application file for complete search history.

(56) References Cited

U.S. PATENT DOCUMENTS 7,716,724 B2   5/2010   Kuhn et al.
7,941,663 B2   5/2011   Sarikaya
(Continued)

FOREIGN PATENT DOCUMENTS

CN   1501658 A      6/2004
CN   101563881 A   10/2009
(Continued)

OTHER PUBLICATIONS

"IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications Amendment 1: Fast Initial Link Setup," IEEE Standard 802.11ai, 2016.
"IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 4: Protected Management Frames," IEEE Std 802.11w, Sep. 30, 2009, 111 pages.
(Continued)

*Primary Examiner* — Edward Zee
(74) *Attorney, Agent, or Firm* — Slater Matsil, LLP

(57) ABSTRACT

An embodiment method includes receiving, by an access point (AP), a first authentication request from a station (STA) that requests authentication of the STA, transmitting, by the AP, a second authentication request to a server that requests including extensible authentication protocol (EAP) authentication signaling to verify mutual possession of a shared key between the STA and the server, and receiving, by the AP, a first authentication response from the server in response to the second authentication request. The first authentication response includes an indication that authentication of the STA was successful. The method further includes transmitting, by the AP, a second authentication
(Continued)

response to the STA, and receiving, by the AP, an association request that includes a message integrity code (MIC) from the STA.

9 Claims, 7 Drawing Sheets

Related U.S. Application Data continuation of application No. 14/728,560, filed on Jun. 2, 2015, now Pat. No. 9,674,702, which is a continuation of application No. 13/734,471, filed on Jan. 4, 2013, now Pat. No. 9,077,701.

(60) Provisional application No. 61/583,856, filed on Jan. 6, 2012.

(51) Int. Cl.
*G06F 21/44* (2013.01)
*H04W 12/08* (2009.01)
*H04W 12/04* (2009.01)
*H04W 84/12* (2009.01)

(52) U.S. Cl.
CPC ........ *H04L 63/083* (2013.01); *H04L 63/0876* (2013.01); *H04W 12/0401* (2019.01); *H04W 12/08* (2013.01); *H04L 63/061* (2013.01); *H04L 63/162* (2013.01); *H04W 84/12* (2013.01)

(56) References Cited

U.S. PATENT DOCUMENTS

| | | | |
|---|---|---|---|
| 9,077,701 | B2 | 7/2015 | Sun et al. |
| 9,674,702 | B2 | 6/2017 | Sun et al. |
| 2004/0240412 | A1 | 12/2004 | Winget |
| 2005/0032506 | A1* | 2/2005 | Walker ............... H04L 63/061 455/411 |
| 2007/0104203 | A1* | 5/2007 | Sood ................... H04L 63/14 370/394 |
| 2008/0002653 | A1 | 1/2008 | Hung et al. |
| 2008/0031204 | A1* | 2/2008 | Sood ................... H04L 45/00 370/338 |
| 2011/0126013 | A1 | 5/2011 | Brown et al. |
| 2011/0176457 | A1 | 7/2011 | Yee |
| 2013/0243194 | A1* | 9/2013 | Hawkes ............... H04L 63/067 380/270 |

FOREIGN PATENT DOCUMENTS

| | | |
|---|---|---|
| EP | 2276278 A1 | 1/2011 |
| WO | 2007024357 A2 | 3/2007 |

OTHER PUBLICATIONS

Fang et al., "Using Upper Layer Message IE in TGai," doc: IEEE 802.11-11/01047r1, Jul. 7, 2011, 10 pages.

Fang et al., "Using Upper Layer Message IE in TGai," doc: IEEE 802.11-11/01047r4, Nov. 1, 2011, 16 pages.

Fang et al., "Using Upper Layer Message Ie in TGai," doc: IEEE 802.11-11/01047r5, Nov. 1, 2011, 13 pages.

Harkins, D., "Authentication Protocol for 11ai," IEEE P802.11 Wireless LANs, doc: IEEE 802.11-11/1488r0, Nov. 4, 2011, 8 pages.

Harkins, D. et al., "A Protocol for FILS Authentication," Aruba Networks, IEEE 802.11-11/1429r0, Nov. 2011, 22 pages.

Harkins, D., "FILS Authentication Protocol with a Trusted Third Party," Aruba Networks, IEEE 802.11-11/1488r11, Nov. 4, 2011, 15 pages.

Cam-Winget, N. et al., "IEEE 802.11i Overview," csrc.nist.gov/archive/wireless/S10_802.11i%20Overview-jw1.pdf, 2002, 105 pages.

"IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 2: Fast Basic Service Set (BSS) Transition," IEEE Std 802.11r, Jul. 15, 2008, 126 pages.

Kostantinos, Georgantas, "Fast Initial Authentication, a New Mechanism to Enable Fast WLAN Mobility," Sep. 2011.

"Part 11: Wireless LAN Medium Access Control (MAC) and Physical Layer (PHY) Specifications," IEEE P802.11-REV/mc/D1.4, Draft Standard for Information Technology—Telecommunications and Information Exchange BetweenSystems, Local and Metropolitan Area Networks Specific Requirements, IEEE Apr. 2013, 3235 pages.

"Part 11: Wireless LAN Medium Access Control (MAC) and Physical Layer (PHY) specifications; Amendment 6: Medium Access Control (MAC) and Security Enhancements," IEEE Standard for Information Technology—Telecommunications and information exchange between systems—Local and metropolitan area networks—Specific requirements, IEEE Std 802.11i-2004, Jul. 23, 2004, 190 pages.

"IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications," IEEE Std 802.11, Jun. 12, 2007, 1232 pages.

Sun et al., "Authentication Protocol for 11ai," IEEE P802.11 Wireless LANs, doc: IEEE 802.11-11/1488r0, Dec. 28, 2011, 25 pages.

Sun, R., et al., "TGai FILS Authentication Protocol," IEEE 802.11-12/0039r2, Nov. 15, 2011, 19 pages.

Dantu. R., et al., "EAP methods for wireless networks", Computer Standards and Interfaces, Elsevier, 13 Pages, XP005871183, 2007.

\* cited by examiner

SYSTEMS AND METHODS FOR AUTHENTICATION

This application is a continuation of U.S. patent application Ser. No. 15/492,911 filed on Apr. 20, 2017 and entitled "Systems and Methods for Authentication," which is a continuation of U.S. patent application Ser. No. 14/728,560 filed on Jun. 2, 2015, now U.S. Pat. No. 9,674,702 issued on Jun. 6, 2017, and entitled "Systems and Methods for Authentication," which is a continuation of U.S. patent application Ser. No. 13/734,471 filed on Jan. 4, 2013, now U.S. Pat. No. 9,077,701 issued on Jul. 7, 2015 and entitled "Systems and Methods for Authentication," which claimed the benefit of U.S. Provisional Application No. 61/583,856, filed on Jan. 6, 2012, entitled "System and Methods for IEEE 802.11 TGAi FILS Authentication Protocol," all of which applications are hereby incorporated herein by reference.

TECHNICAL FIELD

The present invention relates to systems and methods for wireless communications, and, in particular, to systems and methods for authentication.

BACKGROUND

IEEE 802.11 is a set of standards for implementing a wireless local area network such as a wireless local area network (WLAN). IEEE 802.11 is a family of protocols that includes a series of half-duplex over the air modulation techniques that use the same basic protocol. The protocol defines the media access control (MAC) layer and the physical (PHY) layer.

IEEE 802.11 incorporates IEEE 802.1x, which defines the encapsulation of the extensible authentication protocol (EAP) over local area network (LAN) (EAPOL). Authentication using 802.1x involves a supplicant, for example a station, an authenticator, for example an access point, and an authentication server.

IEEE 802.11i provides a robust security network association (RSNA) involving a 4-way handshake and a group key handshake, which utilize authentication services and port access controls to establish and change the appropriate cryptographic key.

SUMMARY

An embodiment method includes receiving, by an access point (AP), a first authentication request from a station (STA) that requests authentication of the STA, transmitting, by the AP, a second authentication request to a server that requests including extensible authentication protocol (EAP) authentication signaling to verify mutual possession of a shared key between the STA and the server, and receiving, by the AP, a first authentication response from the server in response to the second authentication request. The first authentication response includes an indication that authentication of the STA was successful. The method further includes transmitting, by the AP, a second authentication response to the STA, and receiving, by the AP, an association request that includes a message integrity code (MIC) from the STA. In one example, the indication that authentication of the STA was successful is included in the second authentication response. In the same example, or another example, the method further includes receiving an EAP request identity transmission from the STA, and receiving an EAP response message from the STA. In any of the preceding examples, or in another example, the association request further includes an EAP over local area network (LAN) (EAPOL) key. In any of the preceding examples, or in another example, the second authentication request is a fast initial link setup (FILS) authentication request. In any of the preceding examples, or in another example, the method further includes transmitting an associating response to the STA in response to receiving the associating request. An apparatus and computer program product for performing this method are also provided.

An embodiment method includes transmitting, by a station to an access point (AP), a fast initial link setup (FILS) authentication request and transmitting, by the station to the AP, an authorization request, where the authorization request includes an extensible authentication protocol (EAP) over local area network (LAN) (EAPOL) key. The method also includes receiving, by the station from the AP, an association response, where the association response includes the EAPOL key.

An embodiment method includes receiving, by an access point (AP) from a station, a fast initial link setup (FILS) authentication request and receiving, by the AP from the station, an authorization request, where the authorization request includes an extensible authentication protocol (EAP) over local area network (LAN) (EAPOL) key. The method also includes transmitting, by the AP to the station, an association response, where the association response includes the EAPOL key.

An embodiment method includes generating a pairwise master key (PMK) and transmitting, by an authorization server to an access point (AP), the PMK. The method also includes receiving, by the authorization server from the AP, an authorization response, where the authorization response includes an extensible authentication protocol (EAP) over local area network (LAN) (EAPOL) key.

An embodiment authorization server includes a processor and a non-transitory computer readable storage medium storing programming for execution by the processor. The programming includes instructions to generate a pairwise master key (PMK) and transmit, to an access point (AP), the PMK. The programming also includes instructions to receive, from the AP, an authorization response, where the authorization response includes an extensible authentication protocol (EAP) over local area network (LAN) (EAPOL) key.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
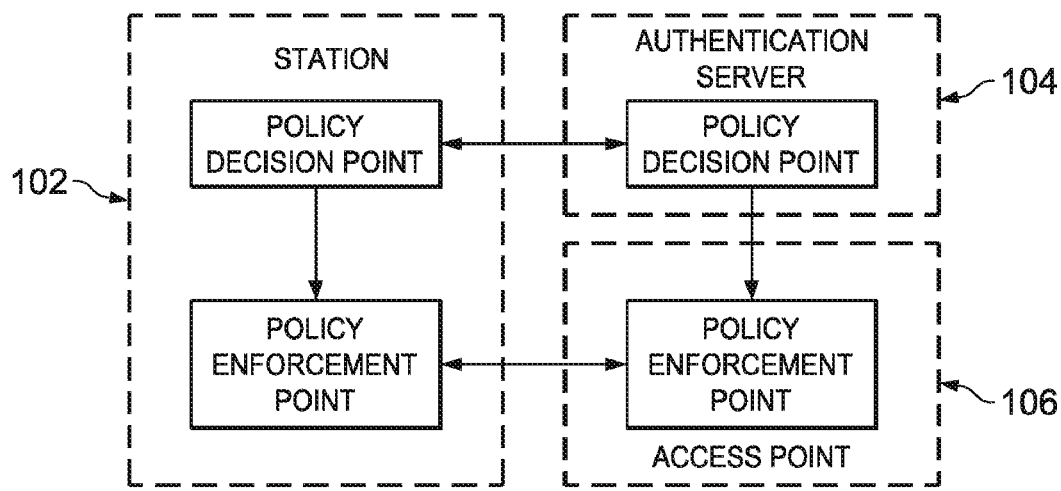
FIG. 1 illustrates a block diagram of a system for RSNA authentication.

Fast initial link setup (FILS) is intended to reduce the time it takes for a station to connect with an access point (AP) with a MAC layer protocol for fast authentication and association of a station with an access point. FIG. 1 illustrates a system for performing RSNA. The system includes station (STA) 102, access point (AP) 106, and authorization server (AS) 104. Station 102 performs both the policy decision and policy enforcement. Authorization server 104 performs policy decision, while access point 106 performs policy enforcement.

Figure 2:
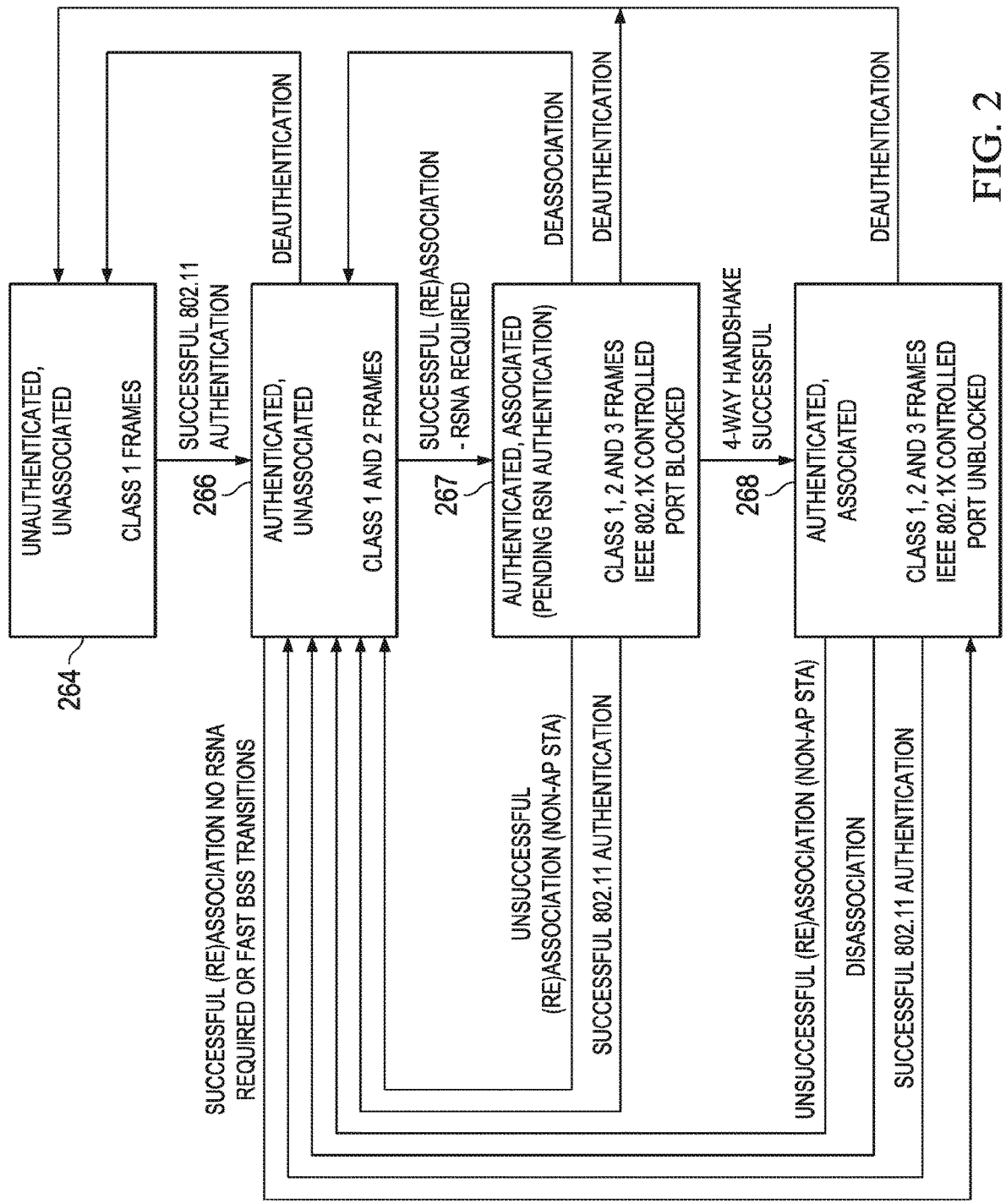
FIG. 2 illustrates a state machine for RSNA authentication.

A state machine for RSNA authentication is illustrated in FIG. 2. The state machine contains state 264, state 266, state 267, and state 268. In state 264, the system is unauthenticated and unassociated. Also, when there is successful 802.11 authentication, the state machine transitions from state 264 to state 266. Then, when the state machine is in state 266, and there is successful association/re-association and RSNA is required, the state machine transitions to state 267. However, when the state machine is in state 266, and there is successful association/re-association and RSNA is not required, or there is a fast basic service set (BSS) transition, the state machine transitions to state 268. When the system is de-associated, there is successful 802.11 authentication, or there is unsuccessful association/re-association, and the state machine is in state 267, the state machine transitions to state 266. Additionally, when the state machine is in state 267, and there is a successful 4-way handshake, the state machine transitions to state 268. Also, when the state machine is in state 268, and there is de-association, unsuccessful association/re-association, or successful 802.11 authentication, the state machine transitions to state 266. When the state machine is in state 266, state 267, or state 268, and the system is deauthenticated, the state machine transitions to state 264.

Figure 3A:
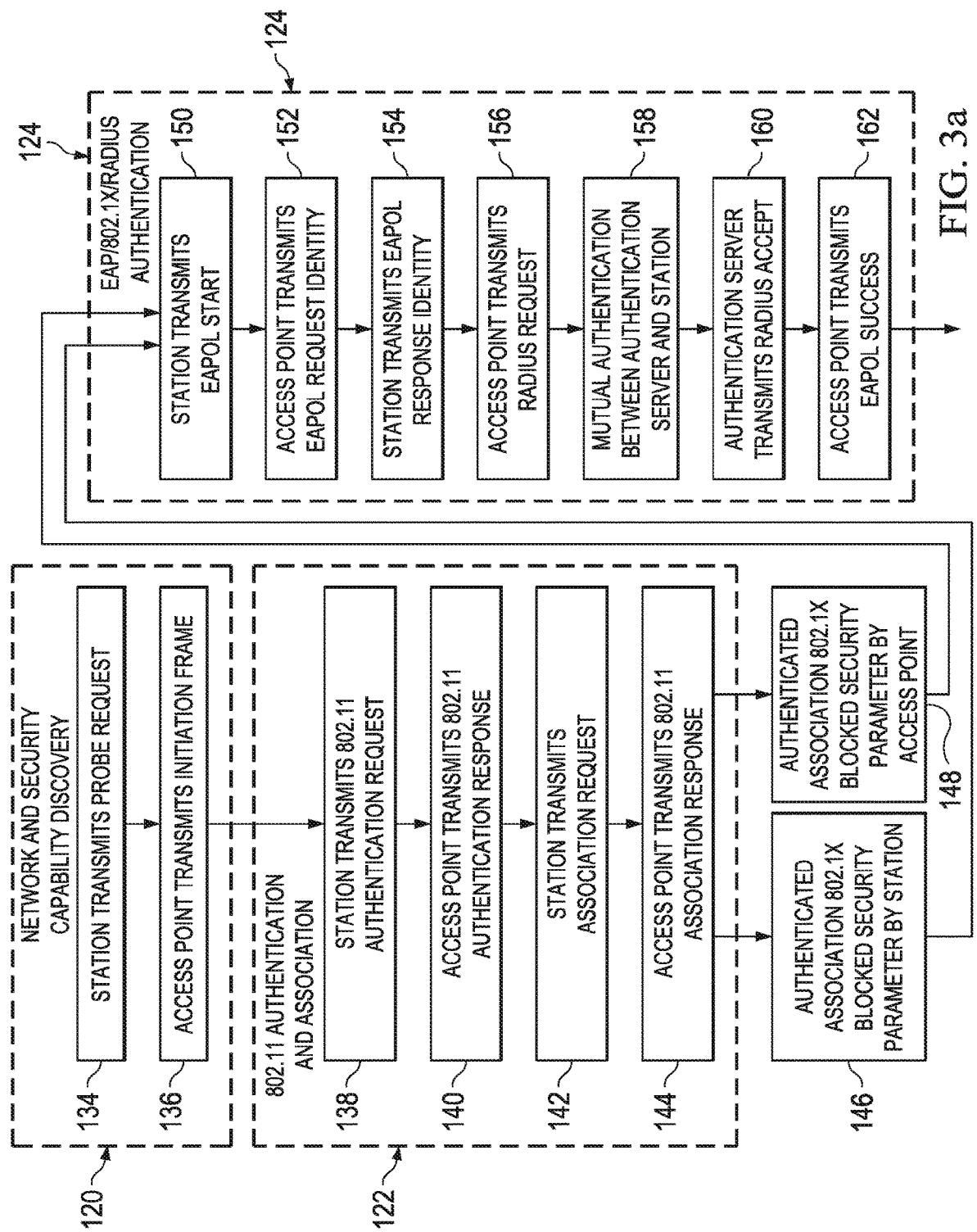
FIGS. 3a-b illustrate a flowchart of a method of authenticating with RSNA.
Figure 3B:
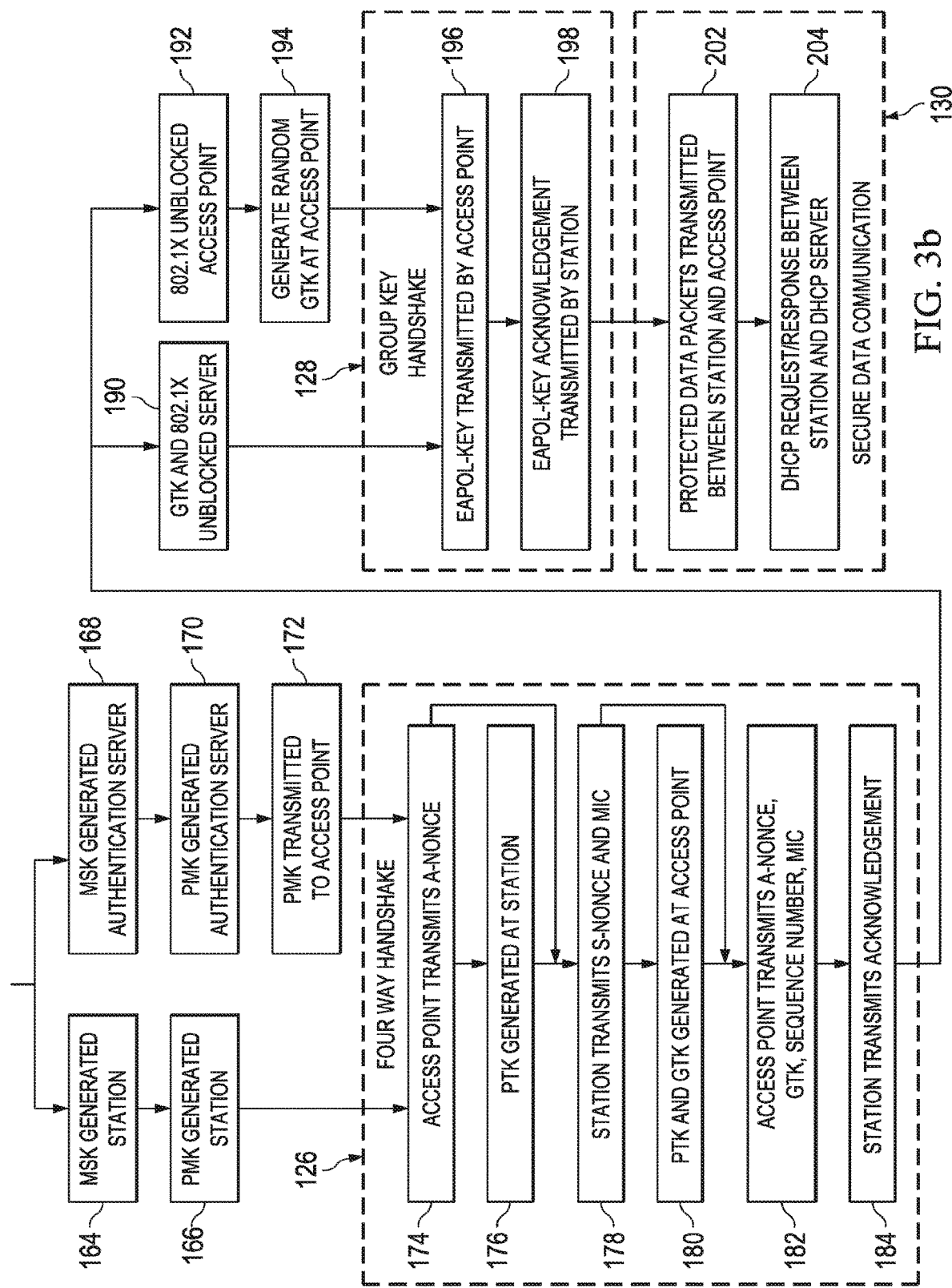

FIGS. 3a-b illustrate a method of performing RSNA authentication. The method includes six stages. Stages 1, 2, and 3 are illustrated in FIG. 3a, while stages 4, 5, and 6 are illustrated in FIG. 3b. As the method progresses through stage 1, stage 2, stage 3, stage 4, and stage 5, the state machine progresses through state 264, state 266, state 267, and state 268. Initially, the station and the access point are unauthenticated, unassociated and 802.1x is blocked. Stage 1 includes network and security capability discovery 120. The access point transmits an initiation frame to the station in step 136. In one embodiment, in step 136, the access point transmits a beacon frame. In another embodiment, the access point transmits a probe response in step 136 in response to a probe request transmitted by the station to the access point in step 134.

Then, in stage 2, 802.11 authentication and association 122 is performed. In step 138, the station transmits an 802.11 authentication request to the access point. Then, in step 140, the access point transmits an 802.11 authentication response to the station. Next, in step 142, the station transmits an association request to the access point. After that, in step 144, the access point transmits an 802.11 association response to the station.

Associated 802.1x blocked security parameters are authenticated in the station in step 146, and in the access point in step 148.

Next, in stage 3, EAP/802.1x/Radius authentication 124 is performed. A mutual authentication protocol is performed based on EAP authentication. The access point serves as an authenticator to relay EAP messages. In step 150, the station optionally transmits EAPOL Start. Then, in step 152, the access point transmits EAPOL Request Identity to the station, and in step 154, the station transmits the EAPOL Response identity to the access point. After that, the access point transmits an access point radius request to the authentication server in step 156. The authentication server and the station perform mutual authentication in step 158. Next, the authentication server transmits a radius accept signal to the access point in step 160, and the access point transmits an EPOL success signal to the station in step 162.

The master session key (MSK) is generated in the station in step 164. The MSK is also generated in the authentication server in step 168. Additionally, the pairwise master key (PMK) is generated in the station in step 166. Also, the PMK is generated in the authentication server in step 170, and the PMK is transmitted from the authentication server to the access point in step 172.

After that, in stage 4, four-way handshake 126 is performed. Both the station and the access point can trust each other with the authorized PMK. In step 174, an A-Nonce value is transmitted by the access point to the station. The station then constructs a pairwise transient key (PTK) in step 176. Next, in step 178, the station transmits an S-Nonce value to the access point with a message integrity code (MIC) including authentication. After that, in step 180, the access point constructs the PTK and the group temporal key (GTK). The access point, in step 182, transmits the GTK, the A-Nonce value, a sequence number that will be used in the next multicast or broadcast frame, and another MIC. In step 184, the station transmits an acknowledgement to the access point.

Next, in step 190, the GTK is generated and the 802.1x server is unblocked in the station. Also, 802.1x is unblocked in the access point in step 192. A random GTK is generated in the access point in step 194. Then, in optional stage 5, group key handshake 128 is performed. In step 196, the access point transmits an EAPOL key containing the GTK, a key ID, and a MIC to the station. The station responds, in step 198, by transmitting an acknowledgement of the new GTK to the access point.

Finally, in Stage 6, secure data communication 130 is performed. In step 202, protected data packets are transmitted between the station and the access point. Also, in step 204, dynamic host configuration protocol (DHC) requests and responses between the station and a DHCP server are performed.

Figure 4:
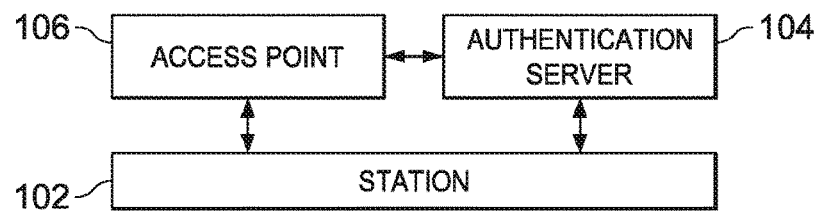
FIG. 4 illustrates an embodiment system for authentication.
Figure 5:
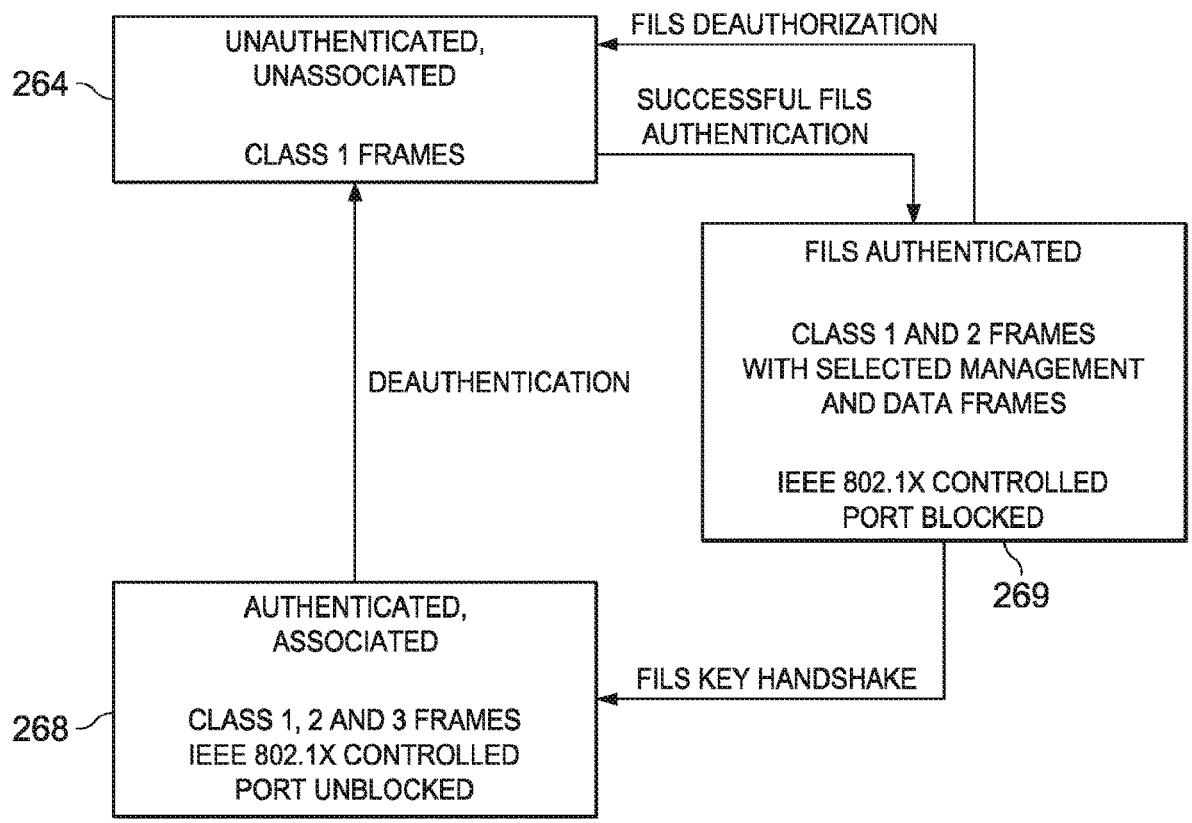
FIG. 5 illustrates an embodiment state machine for authentication.

An embodiment system for authentication is illustrated in FIG. 4. The system includes station 102, which communicates with access point 106 and authentication server 104. Additionally, access point 106 communicates with authentication server 104. In this system, the FILS authentication will take place by bypassing state 2 and state 3. During a specialized state, the FILS authentication exchange will take a condensed version of message exchange compared to the method illustrated by FIGS. 3a-3b. An embodiment state machine for authentication is illustrated in FIG. 5. The state machine contains three states: state 264, state 268, and state 269. In state 264, the system is unauthenticated and unassociated, and there are class 1 frames. When the state machine is in state 264, and there is successful fast initial link setup (FILS) authentication, the state machine transitions to state 269. When the state machine is in state 269, the system is FILS authenticated, and the IEEE 802.1x controlled port is blocked. Also, there are class 1 and 2 frames with selected management and data frames. Then, if the system is in state 269, and there is a FILS key handshake, the system transition to state 268. When the state machine is in state 268 the system is authenticated and associated, and an IEEE 802.1x controlled port is unblocked. Additionally, in state 268, there are class 1, 2, and 3 frames. However, if the state machine is in state 269, and there is FILS deauthorization, the state machine transitions to state 264. Similarly, if the state machine is in state 268, and the system is deauthenticated, the state machine transitions to state 264.

Figure 6:
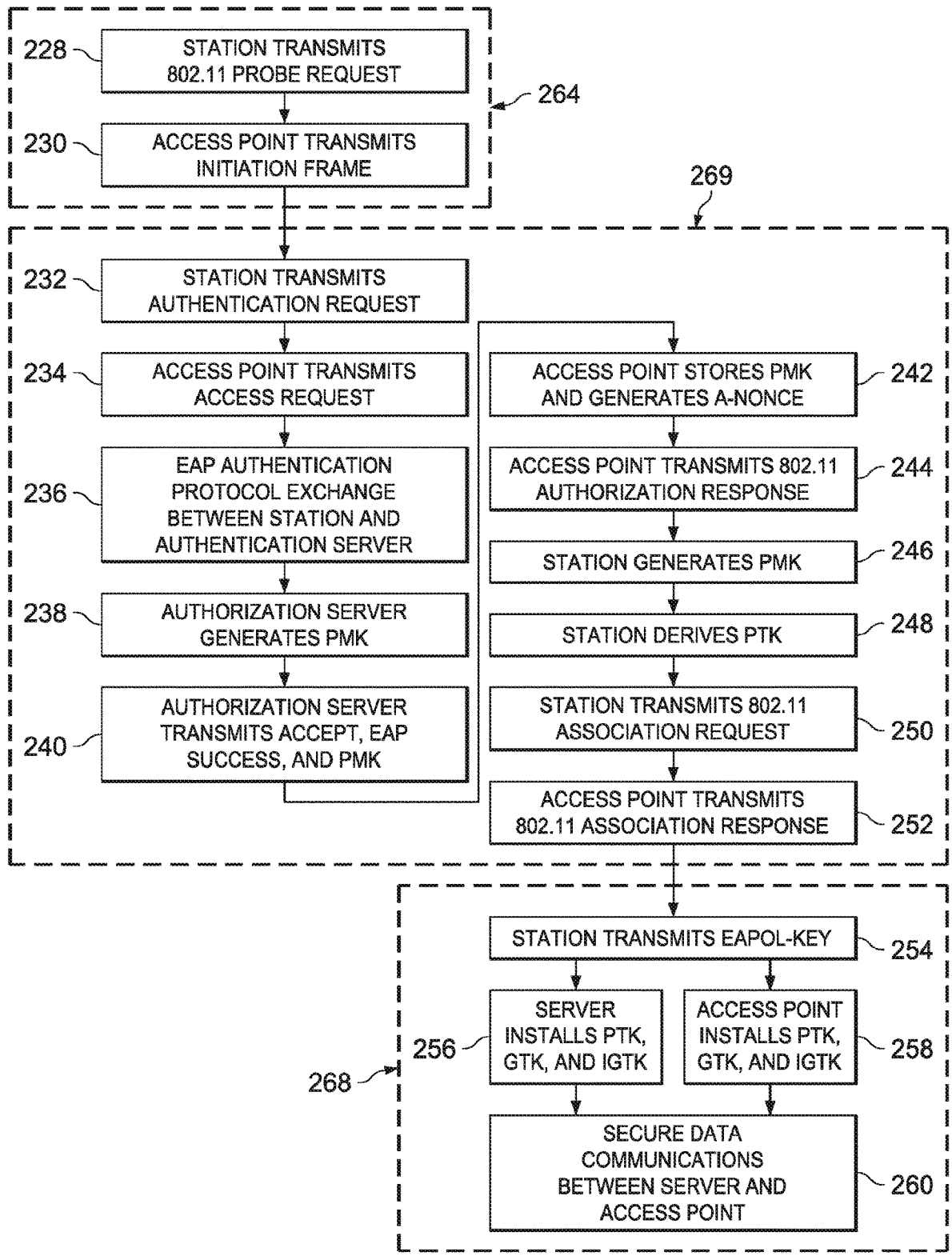
FIG. 6 illustrates a flowchart of an embodiment method of authentication.

A flowchart of an embodiment method for authentication involving a station, an access point, and an authentication server is illustrated in FIG. 6. The method includes state 264, state 269, and state 268. In this embodiment, FILS specific messages are used to facilitate the FILS authentication. Also, in this embodiment, stage 2 and stage 3, discussed above with respect to FIGS. 3a-3b, are bypassed. State 264 corresponds to stage 1, state 269 corresponds to stage 4, and state 268 corresponds to stage 5 and stage 6.

State 264 includes step 228 and step 230. Also, state 269 includes steps 232-252. State 268 includes step 254, step 256, step 258, and step 260. Initially, in state 264, the station and access point are unauthenticated, unassociated, and 802.1x is blocked. While in state 264, the access point transmits an initiation frame to the station in step 230. In one embodiment, in step 230, the access point transmits a beacon frame. In another embodiment, the access point transmits a probe response in step 230 in response to a probe request transmitted by the station to the access point in step 228. Then the system transitions to state 269 if FILS authentication is successful.

Once in state 269, the station transmits an authorization request to the access point in step 232. For example, the authorization request might include EAPOL start with security parameters for a FILS handshake. In one example, an EAP request identity transmission is sent from the station to the access point, and the access point responds with an EAP response message. Next, the access point transmits an access request to the authentication server in step 234. The access request may be an EAP request. Then, in step 236, the station and the authentication server perform an EAP authentication protocol exchange. After that, the authorization server generates a PMK in step 238. Next, in step 240, the authorization server transmits an acceptance, an EAP success, and the PMK to the access point. The access point then stores the PMK and generates an A-Nonce value in step 242. Then, in step 244, the access point transmits an 802.11 authorization response to the server. The 802.11 authorization response may include an EAPOL key, which may include the A-Nonce value and a unicast MIC. Next, the station generates a PMK in step 246 and derives the PTK in step 248. After that, in step 250, the station transmits an 802.11 association request to the access point, which may be an EAPOL key, which may include an S-Nonce value and a unicast MIC. The access point then transmits an 802.11 association response to the station in step 252. The 802.11 association response may include an EAPOL key that may include a PTK, a unicast MIC, and an encrypted GTK or an integrity group temporal key (IGTK).

Finally, in state 268, the station optionally transmits an EAPOL key in step 254, which may contain a unicast MIC, to the access point. Finally the server installs the PTK, the GTK and/or the IGTK in step 256, and the access point installs the PTK, the GTK and/or the IGTK in step 258. Finally, in step 260, secure data communications between the station and the access point proceed.

Figure 7:
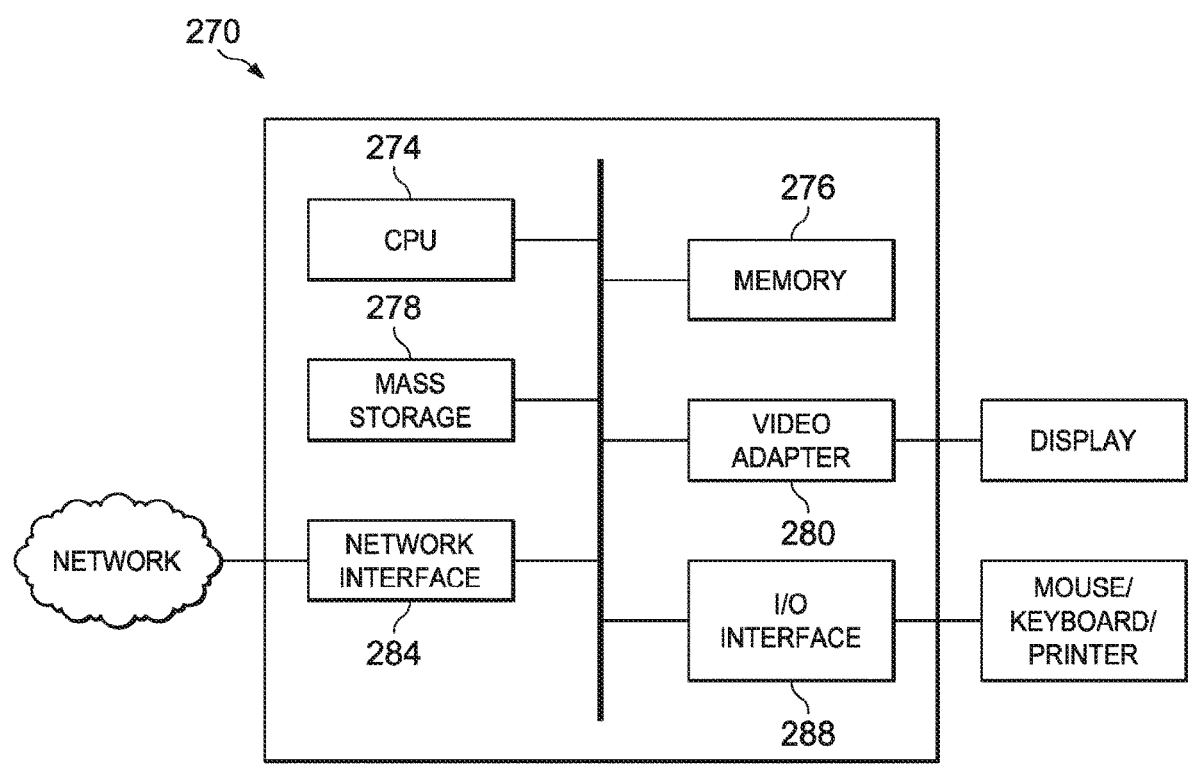
FIG. 7 illustrates a block diagram illustrating a computing platform that may be used for implementing, for example, the devices and methods described herein, in accordance with an embodiment.

FIG. 7 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface.

Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Advantages of an embodiment include compatibility with the RSNA security protocol and security. Another advantage of an embodiment is the use of only nine or ten messages in a handshake. In an example, a four way handshake is reduced to a three way handshake.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for authenticating access to an Institute of Electrical and Electronics Engineers (IEEE) 802.11 network, the method comprising:
   receiving, by an access point (AP) in the 802.11 network, an authentication request from a station (STA), the authentication request requesting authentication of the STA;
   transmitting, by the AP, a fast initial link setup (FILS) authentication request to a server, the FILS authentication request including extensible authentication protocol (EAP) authentication signaling to verify mutual possession of a shared key between the STA and the server;
   receiving, by the AP, a FILS authentication response from the server in response to the FILS authentication request, the FILS authentication response including an indication that authentication of the STA was successful;
   transmitting, by the AP, an authentication response to the STA;
   receiving, by the AP, an IEEE 802.11 association request from the STA, the IEEE 802.11 association request requesting that the STA be associated or re-associated with the IEEE 802.11 network; and
   transmitting, by the AP, an IEEE 802.11 association response to the STA that includes a message integrity code (MIC) and an A-Nonce value in response to receiving the IEEE 802.11 association request.

2. The method of claim 1, wherein the indication that authentication of the STA was successful is included in the authentication response.

3. The method of claim 1, further comprising:
   receiving, by the AP, an EAP request identity transmission from the STA; and
   receiving, by the AP, an EAP response message from the STA.

4. An access point (AP) adapted to provide authenticated access to an Institute of Electrical and Electronics Engineers (IEEE) 802.11 network, the AP comprising:
   a processor; and
   a non-transitory computer readable storage medium storing programming for execution by the processor, the programming including instructions to:
   receive an authentication request from a station (STA), the authentication request requesting authentication of the STA;
   transmit a fast initial link setup (FILS) authentication request to a server, the FILS authentication request including extensible authentication protocol (EAP) authentication signaling to verify mutual possession of a shared key between the STA and the server;
   receive a FILS authentication response from the server in response to the FILS-authentication request, the FILS authentication response including an indication that authentication of the STA was successful;
   transmit an authentication response to the STA;
   receive an IEEE 802.11 association request from the STA, the IEEE 802.11 association request requesting that the STA be associated or re-associated with the IEEE 802.11 network; and
   transmit an IEEE 802.11 association response to the STA that includes a message integrity code (MIC) and an A-Nonce value in response to receiving the IEEE 802.11 association request.

5. The AP of claim 4, wherein the authentication response carries the indication that authentication of the STA was successful as was originally included in the FILS authentication response received from the server.

6. The AP of claim 4, wherein the programming further includes instructions to:
   receive an EAP request identity transmission from the STA; and
   receive an EAP response message from the STA.

7. A method for authenticating access to an Institute of Electrical and Electronics Engineers (IEEE) 802.11 network, the method comprising:
   receiving, by an access point (AP) in the 802.11 network, an authentication request from a station (STA), the authentication request requesting authentication of the STA;
   transmitting, by the AP, a fast initial link setup (FILS) authentication request to a server, the FILS authentication request including extensible authentication protocol (EAP) authentication signaling to verify mutual possession of a shared key between the STA and the server;
   receiving, by the AP, a FILS authentication response from the server in response to the FILS authentication request, the FILS authentication response indicating that authentication of the STA was successful;

transmitting, by the AP, an authentication response to the STA;

receiving, by the AP, an association request from the STA, the association request requesting that the STA be associated or re-associated with the IEEE 802.11 network; and transmitting, by the AP, an association response to the STA in response to receiving the association request, the association response carrying the indication that authentication of the STA was successful.

8. The method of claim 7, wherein the association response includes a message integrity code (MIC) and an A-Nonce value.

9. The method of claim 7, wherein the method further comprises:

receiving, by the AP, an EAP request identity transmission from the STA; and receiving, by the AP, an EAP response message from the STA.

\* \* \* \* \*